United States Patent
Brdiczka et al.

(10) Patent No.: US 8,612,457 B2
(45) Date of Patent: Dec. 17, 2013

(54) METHOD AND SYSTEM FOR COMPARING DOCUMENTS BASED ON DIFFERENT DOCUMENT-SIMILARITY CALCULATION METHODS USING ADAPTIVE WEIGHTING

(75) Inventors: Oliver Brdiczka, Mountain View, CA (US); Petro Hizalev, Palo Alto, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 177 days.

(21) Appl. No.: 13/073,836

(22) Filed: Mar. 28, 2011

(65) Prior Publication Data

US 2012/0254165 A1 Oct. 4, 2012

(51) Int. Cl.
*G06F 7/00* (2006.01)

(52) U.S. Cl.
USPC ................................ 707/749; 706/12; 706/58

(58) Field of Classification Search
None
See application file for complete search history.

(56) References Cited

U.S. PATENT DOCUMENTS

| | | | |
|---|---|---|---|
| 6,289,342 B1 | 9/2001 | Lawrence | |
| 7,080,073 B1 * | 7/2006 | Jiang et al. | 707/999.007 |
| 7,120,868 B2 | 10/2006 | Salesin | |
| 7,231,388 B2 | 6/2007 | Matsubayashi | |
| 7,472,131 B2 | 12/2008 | Shanahan | |
| 7,533,094 B2 | 5/2009 | Zhang | |
| 2003/0074368 A1 * | 4/2003 | Schuetze et al. | 707/103 R |
| 2003/0074369 A1 * | 4/2003 | Schuetze et al. | 707/103 R |
| 2004/0181527 A1 * | 9/2004 | Burdick et al. | 707/6 |
| 2007/0005588 A1 * | 1/2007 | Zhang et al. | 707/5 |
| 2007/0019864 A1 * | 1/2007 | Koyama et al. | 707/3 |
| 2007/0185871 A1 * | 8/2007 | Canright et al. | 707/7 |
| 2008/0162455 A1 * | 7/2008 | Daga et al. | 707/5 |
| 2008/0162456 A1 * | 7/2008 | Daga et al. | 707/5 |
| 2008/0215571 A1 * | 9/2008 | Huang et al. | 707/5 |
| 2009/0210406 A1 | 8/2009 | Freire | |
| 2011/0270845 A1 * | 11/2011 | Lin et al. | 707/748 |

* cited by examiner

*Primary Examiner* — Anh Tai Tran
(74) *Attorney, Agent, or Firm* — Shun Yao; Park, Vaughan, Fleming & Dowler LLP

(57) ABSTRACT

One embodiment provides a system for comparing documents based on different document-similarity calculation methods using adaptive weighting. During operation, the system receives at least two document-similarity values associated with two documents, wherein the document-similarity values are calculated by different document-similarity calculation methods. The system then determines the weight of a respective document-similarity calculation method for each of the two documents, as well as a weight-combination function for calculating a combined weight of the respective document-similarity calculation method associated with the two documents. Next, the system generates a combined similarity value based on the document-similarity values and the weight-combination function.

12 Claims, 4 Drawing Sheets

METHOD AND SYSTEM FOR COMPARING DOCUMENTS BASED ON DIFFERENT DOCUMENT-SIMILARITY CALCULATION METHODS USING ADAPTIVE WEIGHTING

BACKGROUND

1. Field

This disclosure is generally related to analysis of document similarities. More specifically, this disclosure is related to comparing documents based on different document-similarity calculation methods.

2. Related Art

Modern workers often deal with large numbers of documents; some are self-authored, some are received from colleagues via email, and some are downloaded from websites. Many documents are often related to one another since a user may modify an existing document to generate a new document. For example, a worker may generate an annual report by combining a number of previously generated monthly reports. When email users correspond back-and-forth to each other discussing a related topic, email messages often share similar words or combinations of words. For example, conversations discussing local weather may all include words like "rain," "snow," or "wind."

Therefore, some document-similarity calculation methods rely on the comparison of the occurrences of meaningful words that are defined as "entities" in order to derive similarities between messages or conversations. Other methods estimate document similarity by detecting a sequence of operations performed when the document is generated. However, such approaches do not consider possible comparison between documents based on different document-similarity calculation methods.

SUMMARY

One embodiment of the present invention provides a system for comparing documents based on different document-similarity calculation methods using adaptive weighting. During operation, the system receives at least two document-similarity values associated with two documents, wherein the document-similarity values are calculated by different document-similarity calculation methods. The system then determines the weight of a respective document-similarity calculation method for each of the two documents, as well as a weight-combination function for calculating a combined weight of the respective document-similarity calculation method associated with the two documents. Next, the system generates a combined similarity value based on the document-similarity values and the weight-combination function.

In a variation on this embodiment, the document-similarity calculation methods include one or more of: text-based, visual-based, usage-based, and social network-based document-similarity calculation methods.

In a variation on this embodiment, while determining the weight of a document-similarity calculation method, the system initializes the weight, and updates the weight based on user feedback.

In a further variation, the weight of the document-similarity calculation method for each document is initialized based at least on one of: document type, document location, document structure, document usage, and weights of related documents.

In a further variation, the weight of the document-similarity calculation method for each document is updated by applying a learning algorithm to the weight based on user feedback.

In a variation on this embodiment, the weight-combination function is a real-valued function that calculates an average, a minimum, or a maximum of the weights.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention solve the problem of comparing documents based on different document-similarity calculation methods. During operation, the system receives at least two document-similarity values associated with two documents, the document-similarity values calculated by different document-similarity calculation methods. Next, the system determines a weight of a respective document-similarity calculation method for each of the two documents, as well as a weight-combination function for calculating a combined weight of the respective document-similarity calculation method associated with the two documents. The system subsequently generates a combined similarity value based on the document-similarity values and the weight-combination function.

In order to derive similarities between messages or conversations, some calculation methods compare the occurrences of meaningful words or "entities" in the messages. Other methods estimate document similarity by detecting document usage or a sequence of operations performed when the document is circulated. When image files and presentation slides are compared, visual similarities are often discovered. With social networks gaining wide popularity, a social network-based method determines document similarities based on social connections between the documents.

Embodiments of the present invention provide a method for efficiently combining these independent document-similarity calculation methods, while accounting for different document types, user behavior, and user preferences. For example, when calculating the similarities between document a and document b, a number of k calculation methods are deployed, which produce k similarity results $s_i(a,b)$, where i=1 . . . k. In order to combine the k results, a weight $\alpha_i$ is assigned to document-similarity calculation method i for document a, and another weight $\beta_i$ is assigned to document-similarity calculation method i for document b. Next, a weight-combination function $f(\alpha_i,\beta_i)$ for calculating a combined weight for the document-similarity calculation method i is determined. The combined similarity value S(a,b) can be calculated as:

$$S(a, b) = \sum_{i=1}^{k} f(\alpha_i, \beta_i) \cdot s_i(a, b). \quad (1)$$

Figure 1:
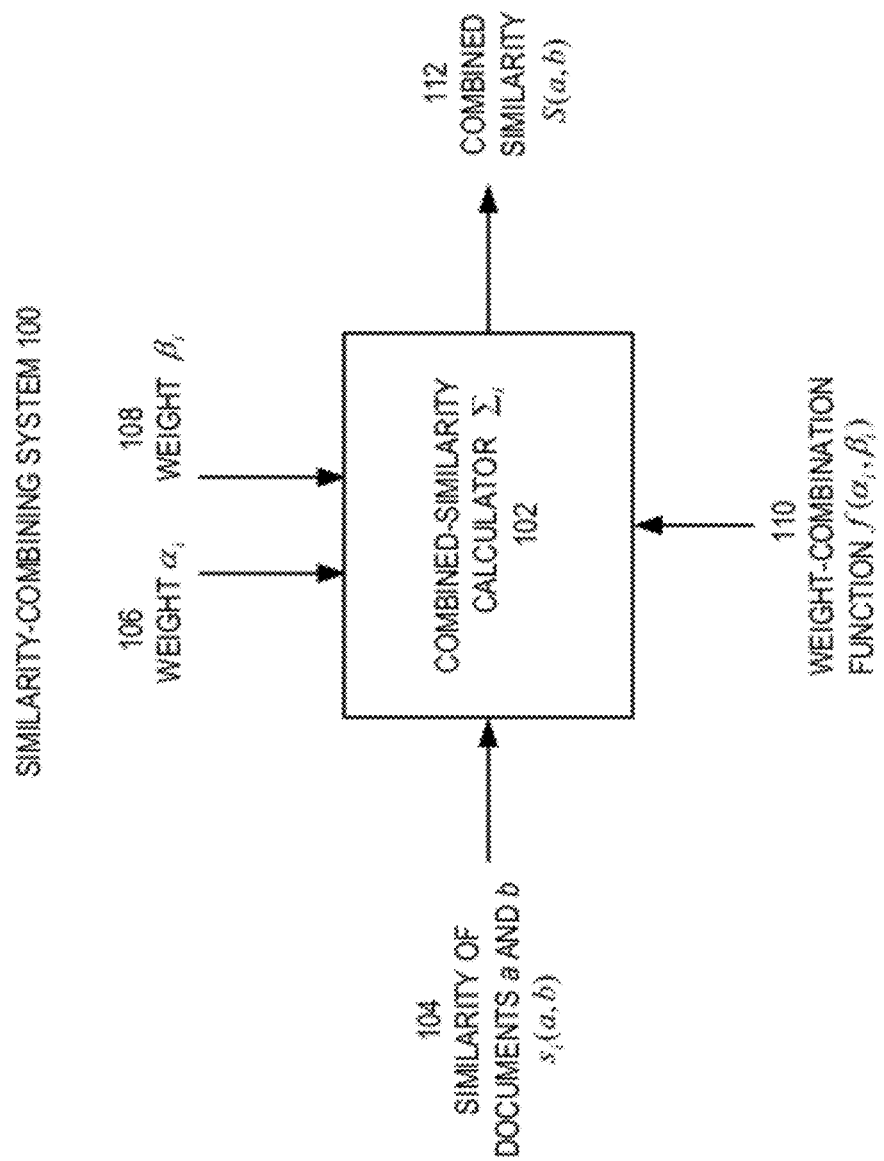
FIG. 1 presents a diagram illustrating a similarity-combining system in accordance with an embodiment of the present invention.

FIG. 1 presents a diagram illustrating a similarity-combining system in accordance with an embodiment of the present invention. Similarity-combining system 100 includes a combined-similarity calculator 102, a number of inputs 104-110, and an output 112. During operation, combined-similarity calculator 102 receives input 104 of the similarity result $s_i(a, b)$, input 106 of the weight $\alpha_i$, input 108 of the weight $\beta_i$, input 110 of the weight-combination function $f(\alpha_i,\beta_i)$. Combined-similarity calculator 102 then calculates output 112 of the combined similarity value S(a,b) based on the inputs.

The weight-combination function $f(\alpha_i,\beta_i)$ for calculating a combined weight for the document-similarity calculation method i may take different forms, such as a real-valued function that calculates an average, a minimum, or a maximum of its parameters. For example, $f(\alpha_i,\beta_i)$ may be defined as a linear combination of $\alpha_i$ and $\beta_i$:

$$f(\alpha_i,\beta_i) = x \cdot \alpha_i + y \cdot \beta_i \quad (2),$$

where x+y=1. If x=y, $f(\alpha_i,\beta_i)$ equals the average of $\alpha_i$ and $\beta_i$. Furthermore, if the similarity between document a and document b is not symmetrical, i.e., $s_i(a,b) \neq s_i(b,a)$, function $f(\alpha_i, \beta_i)$ can account for this by setting x≠y. Specifically, in case of x>y, the combined weight $f(\alpha_i,\beta_i)$ emphasizes the direction of comparison from document a to document b.

Figure 2:
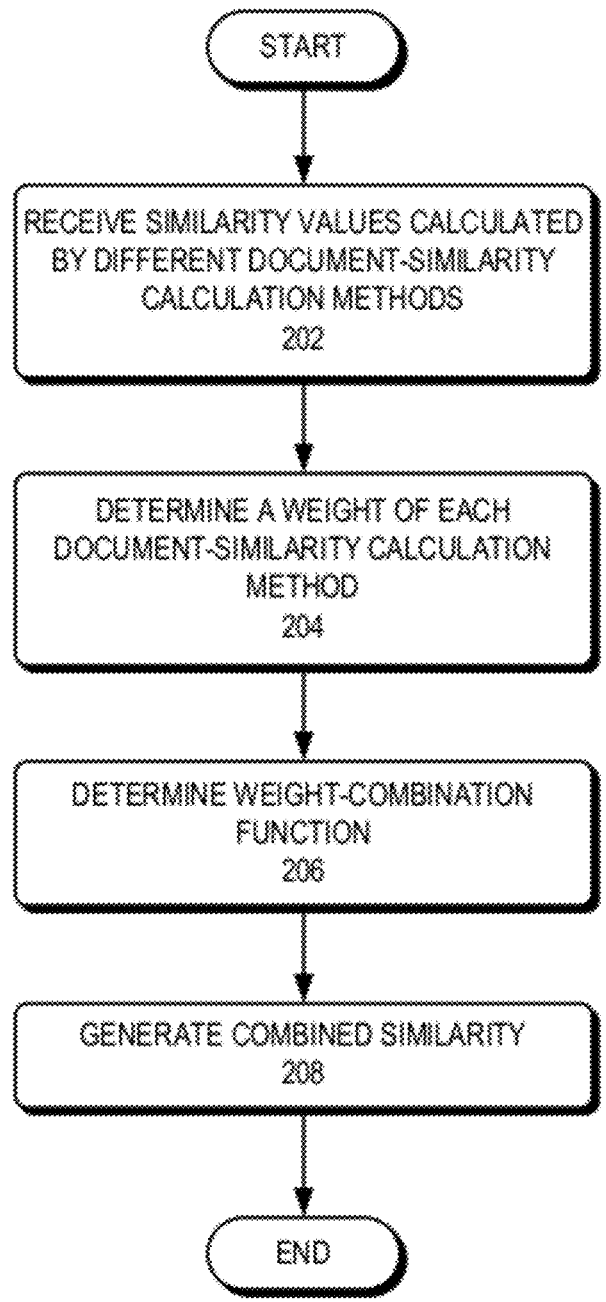
FIG. 2 presents a flowchart illustrating the process of comparing documents in accordance with an embodiment of the present invention.

FIG. 2 presents a flowchart illustrating the process of comparing documents in accordance with an embodiment of the present invention. During operation, the system receives a number of similarity values calculated by different document-similarity calculation methods (operation 202). The system then determines a weight of each document-similarity calculation method (operation 204). Next, the system determines a weight-combination function (operation 206). Subsequently, the system generates a combined similarity (operation 208).

Adaptive Weighting

Figure 3:
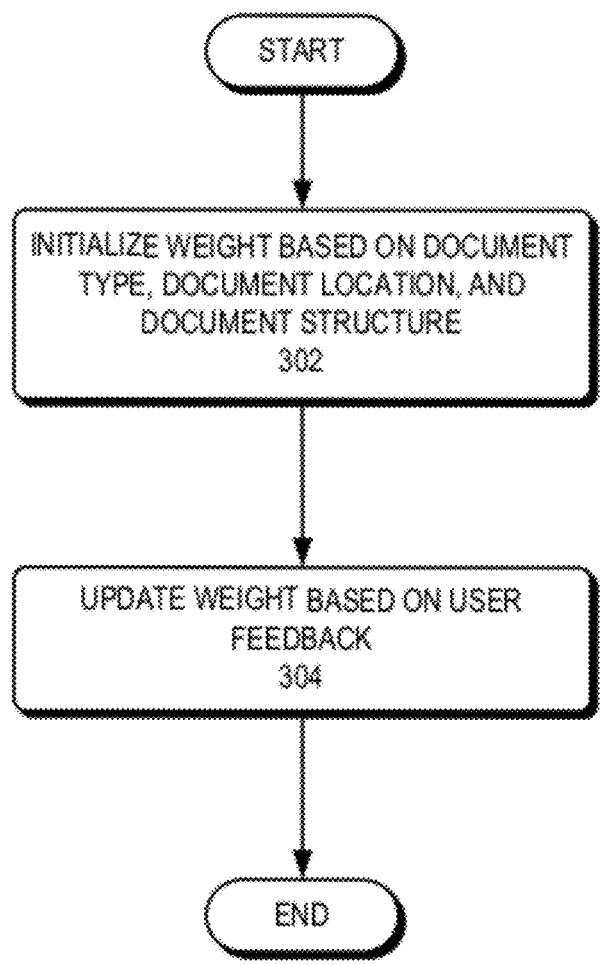
FIG. 3 presents a flowchart illustrating the process of determining a weight of a document-similarity calculation method for a document in accordance with an embodiment of the present invention.

When determining the weight of a document-similarity calculation method, the document-comparing system needs to initialize the weight value and update it based on user feedback. FIG. 3 presents a flowchart illustrating the process of determining a weight of a document-similarity calculation method for a document in accordance with an embodiment of the present invention. During operation, the system initializes the weight value based on the document type, document location, and document structure (operation 302), and updates the weight based on user feedback (operation 304).

Each document has a vector of document-similarity method weights associated with different calculation methods. Initial value of this vector can be derived from the document type, document location, and document structure. The weight vector can also be initialized based on the weight of related documents, location of the related documents, or frequency of the document usage.

However, the initially assigned weight values may not be accurate and may need to be adjusted during use. It is vital that users provide feedback by ranking the similarity-combining results and pointing out inconsistencies in those results. Based on user feedback, the weight can be updated and constantly refined for each similarity calculation method. Machine learning algorithms can be applied for this purpose, taking the similarity values as input, the weights as output, and user feedback as ground truth. In one embodiment, the system applies a boosting algorithm, such as Adaboost, to learn and update the weights. AdaBoost adaptively tweaks weights in favor of those instances singled out as inconsistent results. Therefore, the refined weights can correct the inconsistency.

Exemplary Computer System

Figure 4:
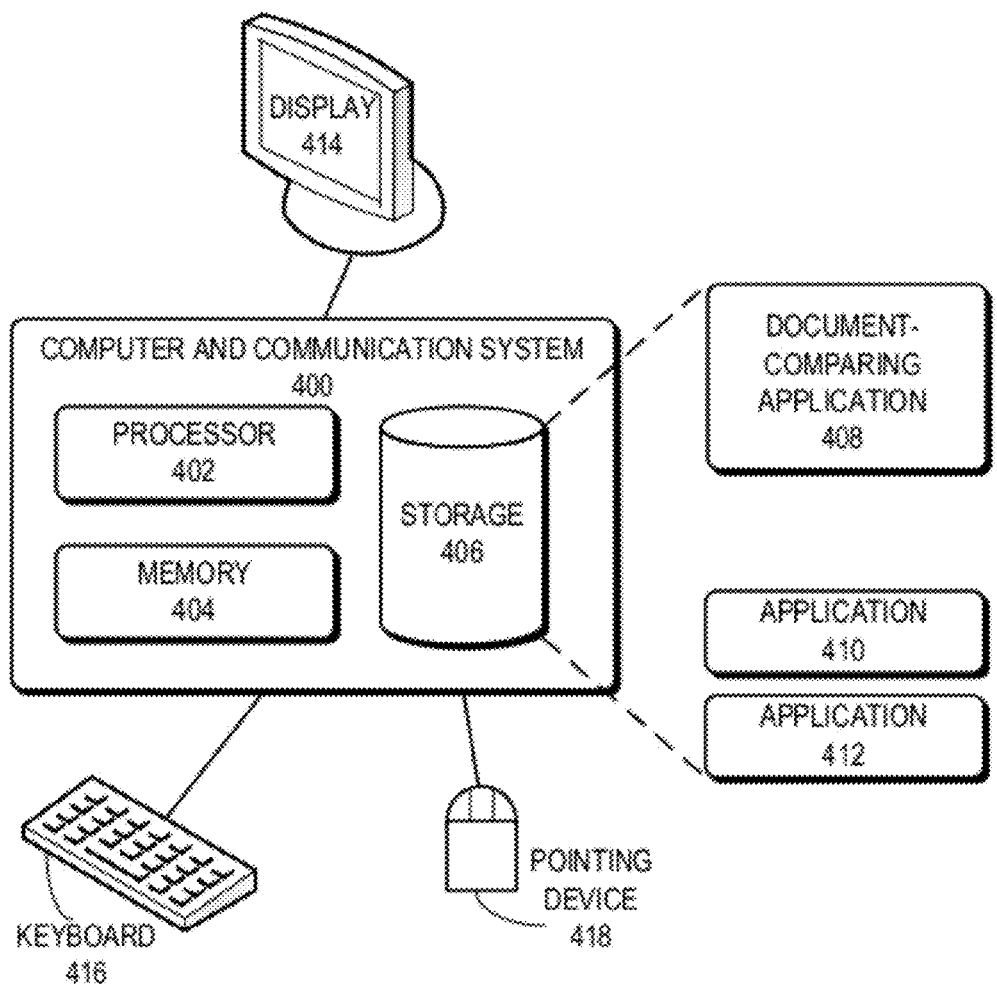
FIG. 4 illustrates an exemplary computer system for comparing documents in accordance with one embodiment of the present invention.

FIG. 4 illustrates an exemplary computer system for comparing documents in accordance with one embodiment of the present invention. In one embodiment, a computer and communication system 400 includes a processor 402, a memory 404, and a storage device 406. Storage device 406 stores a document-comparing application 408, as well as other applications, such as applications 410 and 412. During operation, document-comparing application 408 is loaded from storage device 406 into memory 404 and then executed by processor 402. While executing the program, processor 402 performs the aforementioned functions. Computer and communication system 400 is coupled to an optional display 414, keyboard 416, and pointing device 418.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-executable method for comparing documents, the method comprising:
   - receiving, by a computer, a number of document-similarity values $s_i(a,b)$ associated with two documents, the document-similarity values being calculated by different document-similarity calculation methods, which are indexed by i;
   - determining weights $(\alpha_i, \beta_i)$ of a respective document-similarity calculation method i for each of the two documents a and b respectively, wherein $\alpha_i$ corresponds to document a and $\beta_i$ corresponds to document b, wherein determining the weights of a document-similarity calculation method involves:
   - initializing the weights; and
   - updating the weights based on user feedback, wherein updating the weights of the document-similarity calculation method for each document involves applying a learning algorithm to the weights based on user feedback;
   - determining a weight-combination function $f(\alpha_i,\beta_i)$ for calculating a combined weight of the respective document-similarity calculation method i associated with the two documents, wherein the weight-combination function accounts for the direction of comparison between the documents a and b; and
   - generating, by the computer, a combined similarity value S(a,b) based on the document-similarity values calculated by k different document-similarity calculation methods and the weight-combination function, given by:

$$S(a, b) = \sum_{i=1}^{k} f(\alpha_i, \beta_i) \cdot s_i(a, b).$$

2. The method of claim 1, wherein the document-similarity calculation methods include one or more of: text-based, visual-based, usage-based, and social network-based document-similarity calculation methods.

3. The method of claim 1, wherein the weight of the document-similarity calculation method for each document is initialized based at least on one of: document type, document location, document structure, document usage, and weights of related documents.

4. The method of claim 1, wherein the weight-combination function is a real-valued function that calculates an average, a minimum, or a maximum of the weights.

5. A non-transitory computer-readable storage medium storing instructions that when executed by a computer cause the computer to perform a method for comparing documents, the method comprising:
   - receiving a number of document-similarity values $s_i(a,b)$ associated with two documents, the document-similarity values being calculated by different document-similarity calculation methods, which are indexed by i;
   - determining weights $(\alpha_i,\beta_i)$ of a respective document-similarity calculation method i for each of the two documents a and b respectively, wherein $\alpha_i$ corresponds to document a and $\beta_i$ corresponds to document b, wherein determining the weights of a document-similarity calculation method involves:
   - initializing the weights; and
   - updating the weights based on user feedback, wherein updating the weights of the document-similarity calculation method for each document involves applying a learning algorithm to the weights based on user feedback;
   - determining a weight-combination function $f(\alpha_i,\beta_i)$ for calculating a combined weight of the respective document-similarity calculation method i associated with the two documents, wherein the weight-combination function accounts for the direction of comparison between the documents a and b; and
   - generating a combined similarity value S(a,b) based on the document-similarity values calculated by k different document-similarity calculation methods and the weight-combination function, given by:

$$S(a, b) = \sum_{i=1}^{k} f(\alpha_i, \beta_i) \cdot s_i(a, b).$$

6. The computer-readable storage medium of claim 5, wherein the document-similarity calculation methods include one or more of: text-based, visual-based, usage-based, and social network-based document-similarity calculation methods.

7. The computer-readable storage medium of claim 5, wherein the weight of the document-similarity calculation method for each document is initialized based at least on one of: document type, document location, document structure, document usage, and weights of related documents.

8. The computer-readable storage medium of claim 5, wherein the weight-combination function is a real-valued function that calculates an average, a minimum, or a maximum of the weights.

9. A system for estimating a similarity level between documents, comprising:
   - at least one hardware processor couple to at least one memory for estimating the similarity level between documents;
   - a receiving mechanism configured to receive a number of document-similarity values $s_i(a,b)$ associated with two documents, the document-similarity values being calculated by different document-similarity calculation methods, which are indexed by i;
   - a determination mechanism configured to determine:
   - weights $(\alpha_i,\beta_i)$ of a respective document-similarity calculation method i for each of the two documents a and b respectively, wherein $\alpha_i$ corresponds to document a and $\beta_i$ corresponds to document b, wherein determining the weights of a document-similarity calculation method involves:
   - initializing the weights; and
   - updating the weights based on user feedback, wherein updating the weights of the document-similarity calculation method for each document involves applying a learning algorithm to the weights based on user feedback; and
   - a weight-combination function $f(\alpha_i,\beta_i)$ for calculating a combined weight of the respective document-similarity calculation method i associated with the two documents, wherein the weight-combination function accounts for the direction of comparison between the documents a and b; and
   - generating a combined similarity value S(a,b) based on the document-similarity values calculated by k different document-similarity calculation methods and the weight-combination function, given by:

$$S(a, b) = \sum_{i=1}^{k} f(\alpha_i, \beta_i) \cdot s_i(a, b).$$

10. The system of claim 9, wherein the document-similarity calculation methods include one or more of: text-based, visual-based, usage-based, and social network-based document-similarity calculation methods.

11. The system of claim 9, wherein the weight of the document-similarity calculation method for each document is initialized based at least on one of: document type, document location, document structure, document usage, and weights of related documents.

12. The system of claim 9, wherein the weight-combination function is a real-valued function that calculates an average, a minimum, or a maximum of the weights.

* * * * *